United States Patent [19]

Lagasse

[11] 3,839,810
[45] Oct. 8, 1974

[54] AUTOMATIC FISHING ROD MOTION CONTROL

[76] Inventor: Reed J. Lagasse, 28 Allen Pl., Apt. A-7, Hartford, Conn. 06106

[22] Filed: Mar. 2, 1973

[21] Appl. No.: 337,404

[52] U.S. Cl. ............................................. 43/19.2
[51] Int. Cl. .......................................... A01k 97/10
[58] Field of Search ............................ 43/19.2, 16

[56] References Cited
UNITED STATES PATENTS

| | | | |
|---|---|---|---|
| 3,031,790 | 5/1962 | Duryea | 43/19.2 |
| 3,422,561 | 1/1969 | McLean | 43/19.2 |
| 3,550,302 | 12/1970 | Creviston et al. | 43/19.2 |
| 3,665,633 | 5/1972 | Scott | 43/19.2 |

*Primary Examiner*—William H. Camp
*Attorney, Agent, or Firm*—Berman, Bishoff & Platt

[57] ABSTRACT

A device for moving a fishing rod mounted in a holder back and forth at a predetermined length of stroke and speed, giving the lure attached to the fishing line in the water, life-like movement while trolling. An automatic switch, actuated by the fishing line, turns off the motor controlling the back and forth movement of the rod, when a fish strikes the lure. At the same time, a buzzer is sounded, indicating that a fish has been hooked. An adjustment device is provided which allows the force necessary to actuate the switch to be adjusted, depending upon the type of lure used. Camming means, momentarily closing a set of contacts in order to speed up the motor, imparts a slight jerking motion on the forward strike of the rod in order to induce the fish to strike the lure.

13 Claims, 12 Drawing Figures

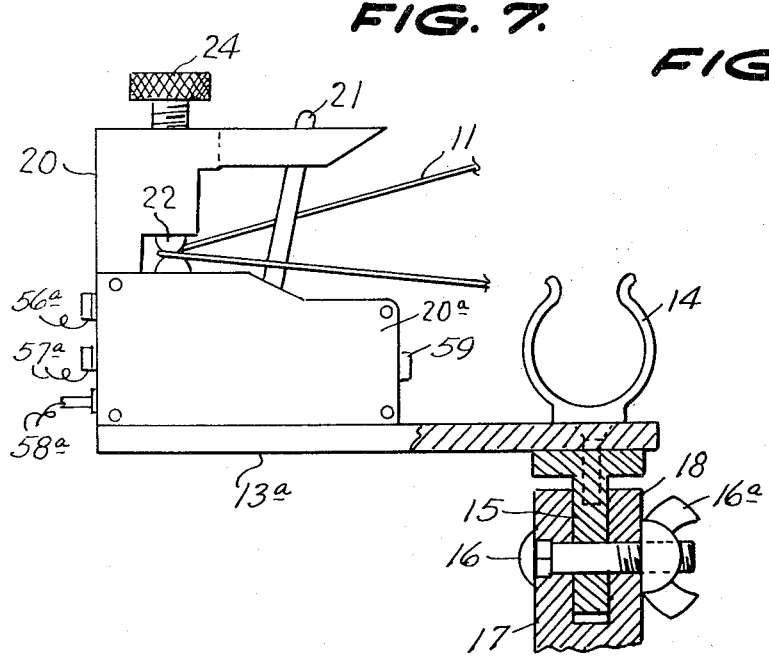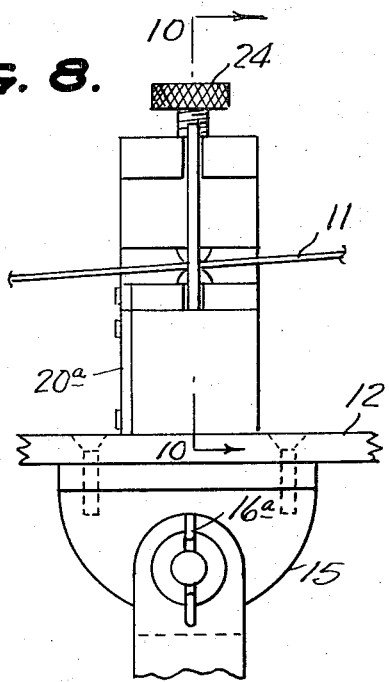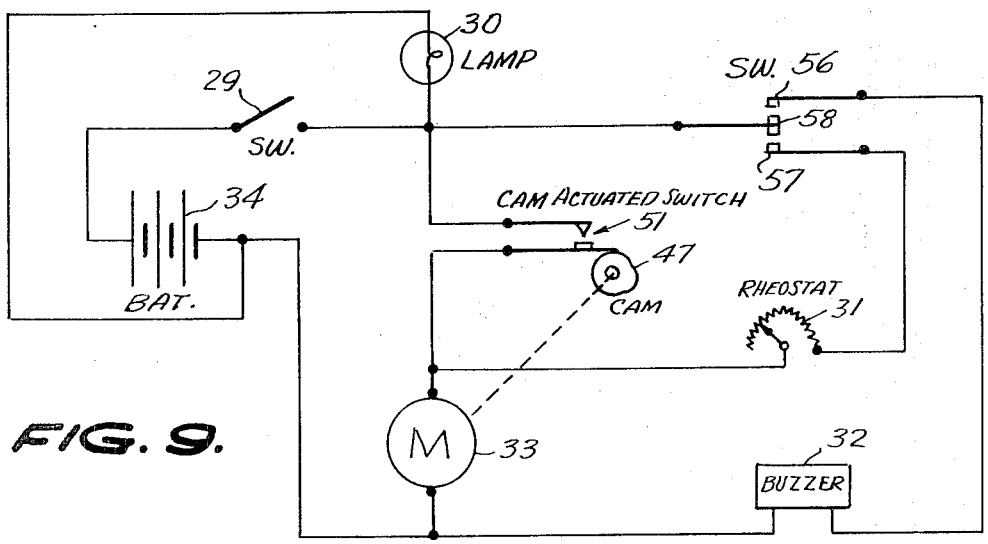

3,839,810

AUTOMATIC FISHING ROD MOTION CONTROL

BACKGROUND OF THE INVENTION

1. Field of the Invention

This invention relates to fishing apparatus and more particularly relates to apparatus for moving a fishing rod mounted in a holder back and forth in a predetermined manner in order to give a lure attached to the line life-like movement.

2. The Prior Art

Various devices have been proposed in the patent literature for automatically imparting movement to a fishing lure in order to induce the fish to bite by imparting a life-like appearance to the lure. However, none of the prior art devices exhibits the degree of control and flexibility of the present invention and all suffer from one or more serious disadvantages.

For example, in U.S. Pat. No. 3,550,302 to Creviston et al., there is no adjustment provided for the length of stroke desired or for the weight of the lure utilized.

SUMMARY OF THE INVENTION

It is a principal object of the present invention to provide a device for moving a fishing rod mounted in a holder back and forth at a predetermined length of stroke and speed in order to give the lure attached to the fishing line in the water life-like movement while trolling.

It is a further object of the present invention to provide an adjustment in such a device for the particular type of lure used.

Still another object of the present invention is to provide a device in an automatic fishing rod motion control apparatus for imparting a slight jerk on the forward stroke of the rod in order to induce the fish to strike when the lure stops momentarily.

These and other objects of the present invention are realized in an apparatus which comprises a mounting plate for a fishing rod which is swiveled back and forth at a predetermined speed, controlled by a rheostat, and at a predetermined length of stroke, controlled by an adjustable linkage to the drive shaft. The fishing line passes behind two spring-loaded steel balls, on which the tension can be preadjusted so that the line will not pull out when utilizing a heavier lure. When a fish strikes the lure, the line is pulled out between the balls, actuating an automatic switch lever which controls a set of contacts to deactivate the drive motor and actuate a signal, such as a buzzer.

In one embodiment of the invention, means are provided for imparting a slight jerk on the forward stroke of the rod in order to cause the lure to stop momentarily and induce a fish to strike. This apparatus comprises a cam driven by the drive motor which momentarily closes a set of contacts and places full voltage across the motor, causing it to speed up, thus giving the fishing rod a slight jerk on the forward stroke.

In a second embodiment of the invention, a small timer motor is utilized in conjunction with the main drive motor to obtain a pause with every forward and backward motion of the fishing rod. This is designed to make the lure appear more life-like and induce the fish to strike.

BRIEF DESCRIPTION OF THE DRAWINGS

FIG. 7 is an enlarged fragmentary front elevational view, showing a portion of the apparatus;

FIG. 8 is a side elevational view, looking from right to left in FIG. 7;

FIG. 9 is a schematic wiring diagram, showing the interconnection of the electrical components of the first embodiment of the invention;

DETAILED DESCRIPTION OF THE INVENTION

Figure 1:
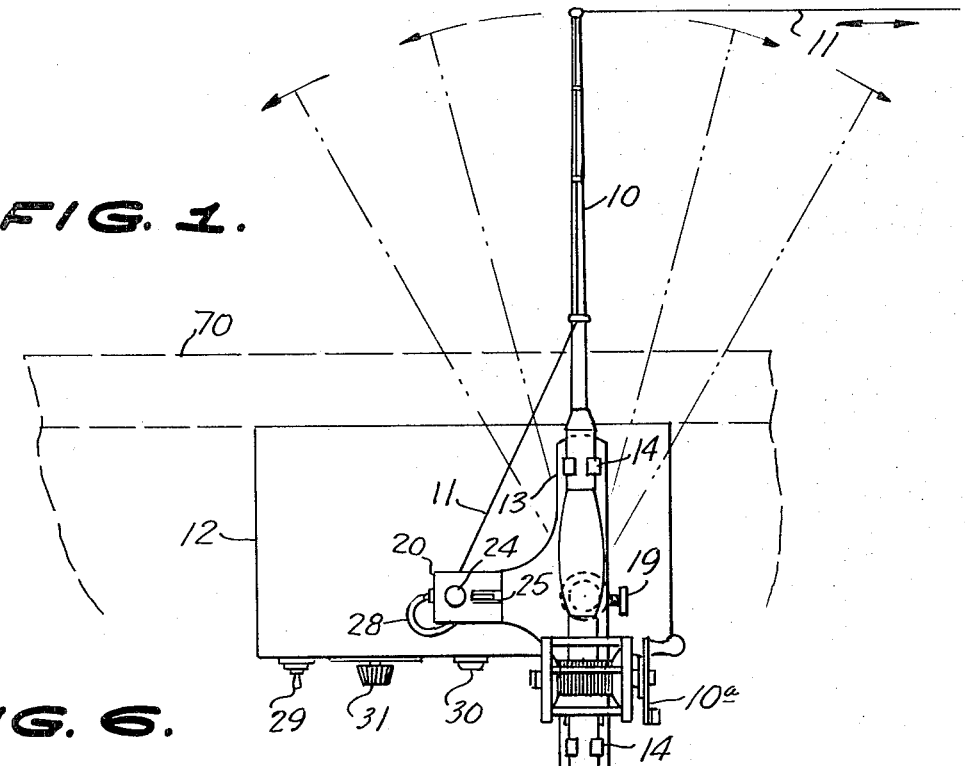
FIG. 1 is a top plan view of the automatic fishing rod motion control apparatus of the present invention with a fishing rod in place.
Figure 6:
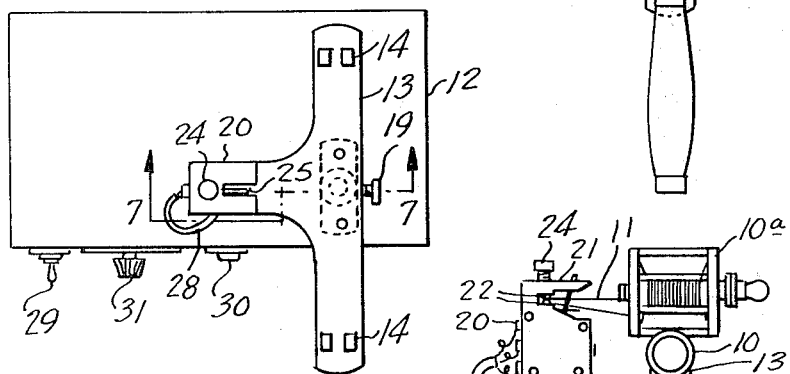
FIG. 6 is a top plan view similar to FIG. 1, with the fishing rod removed.
Figure 2:
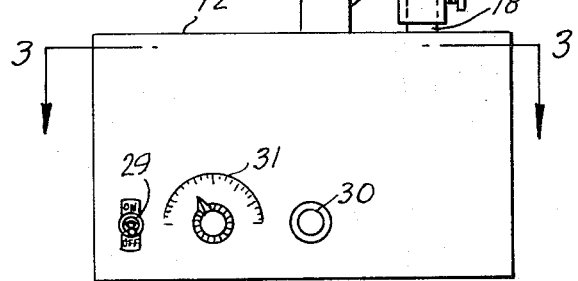
FIG. 2 is a front elevational view of the apparatus shown in FIG. 1.

Referring now to the drawings, and in particular FIGS. 1 through 6 thereof, there is shown the apparatus of the present invention applied to a conventional fishing rod 10 having a reel 10a and line 11. Mounted on casing 12 is rod holder 13 having mounting clips 14 thereon for securely mounting rod 10 thereto, as seen in FIG. 1. Rod holder 13 is integrally formed with tilt mounting 15, shown in more detail in FIG. 7, which is rotatably secured to sleeve 17 by means of lock screw 16. Thus, by loosening wing nut 16a, rod holder 13 may be tilted toward or away from the water, so that the angle or position of the fishing rod may be adjusted as desired. Sleeve 17 is mounted on output shaft 18 by means of lock screw 19, so that, as will appear more fully below, when output shaft 18 oscillates, sleeve 17 and rod holder 13 will oscillate along with it. This will cause rod 10 and line 11 to describe the path of motion indicated by the arrows in FIG. 1, with respect to the side of the boat 70.

Mounted on extension 13a of rod holder 13 is automatic shut-off switch 20, which is illustrated in more detail in FIGS. 7, 8, 10 and 11. With reference to those figures, it can be seen that the automatic shut-off switch 20 comprises an outer housing 20a having a slot 25 in the top thereof through which projects the upper portion of on-off lever 21 which is pivotally mounted at 60. Disposed behind on-off lever 21 are spring-loaded balls 22 on which the tension can be varied by means of tension adjusting screw 24 which varies the compression on spring 23.

Figure 10:
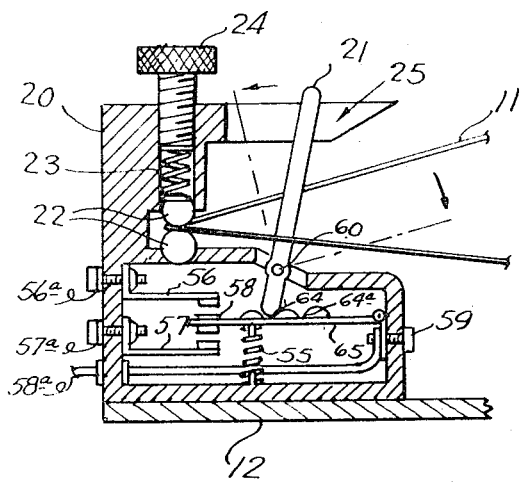
FIG. 10 is a cross-sectional view taken on the line 10—10 in FIG. 8, looking in the direction of the arrows.
Figure 11:
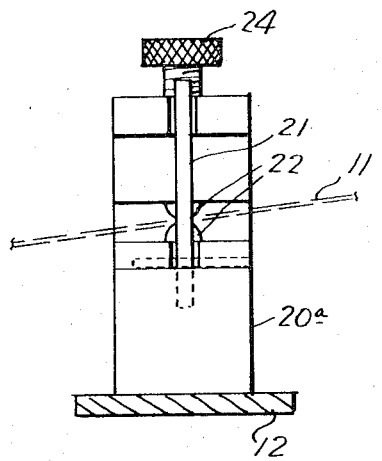
FIG. 11 is a side elevational view, looking from right to left in FIG. 10.

Secured to casing 20a are buzzer contact 56 connected to buzzer lead 56a, motor contact 57 connected to motor lead 57a and power contact 58 connected to battery lead 58a. All leads 56a, 57a and 58a are enclosed within insulation 28 leading from housing 20a and connected to the associated circuitry, as will be more fully described below. Power contact 58 is pivotally mounted to casing 20a by means of lock screw 59 and is urged upwardly toward buzzer contact 56 by spring 55. Lever arm 65, attached to contact 58, carries depressions 64 and 64a thereon. As can be seen in FIG. 10, when on-off lever 21 is in depression 64, contact 58 is in the neutral position, i.e., making no electrical contact with contacts 56 or 57. However, when lever 21 is moved to the left, as seen in FIG. 10, in the direction of the arrow, it will come to rest in depression 64a an contact 58 will make electrical contact with contact 57. Fishing line 11 passes behind lever arm 21 and between balls 22, so that when the line is suddenly jerked forwardly, as when a fish strikes the lure, the line will be pulled from between balls 22 and move lever arm 21 to the right, as seen in FIG. 10. This will cause the lower part of lever arm 21 to move to the left, as seen in FIG. 10, becoming disengaged from either of depressions 64 or 64a. In this condition, the force of spring 55 will urge contact 58 upwardly into electrical contact with contact 56. The purpose for these various movements of lever arm 21 will become more apparent from the discussion set forth below concerning the operation of the device and the electrical circuitry.

Figure 3:
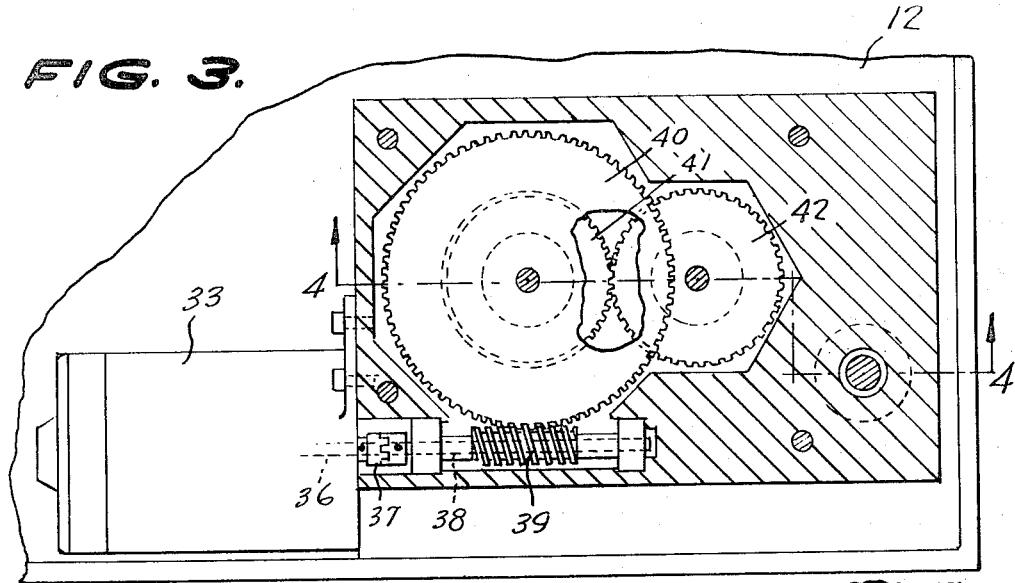
FIG. 3 is a cross-sectional view taken on the line 3—3 in FIG. 2, looking in the direction of the arrows.
Figure 4:
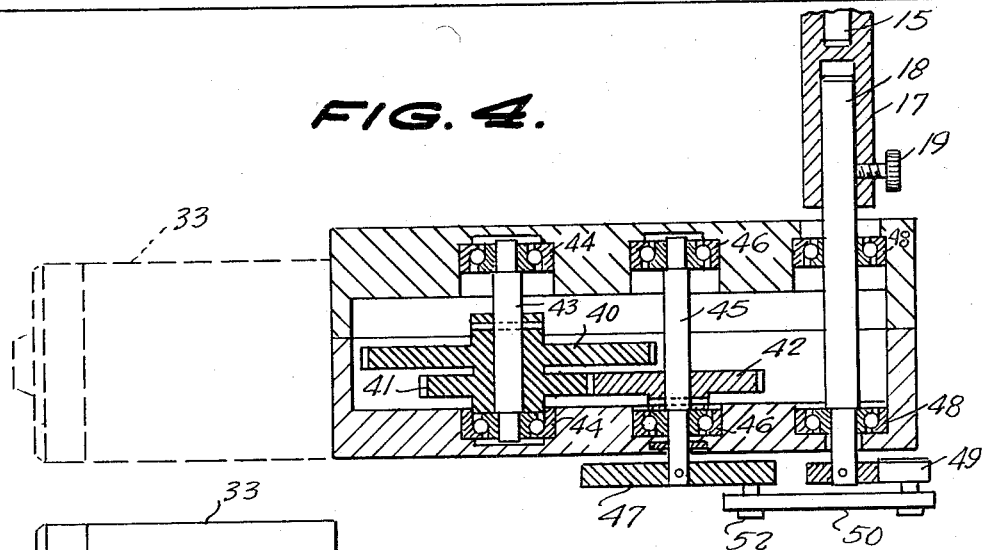
FIG. 4 is a cross-sectional view taken on the line 4—4 in FIG. 3, looking in the direction of the arrows.
Figure 5:
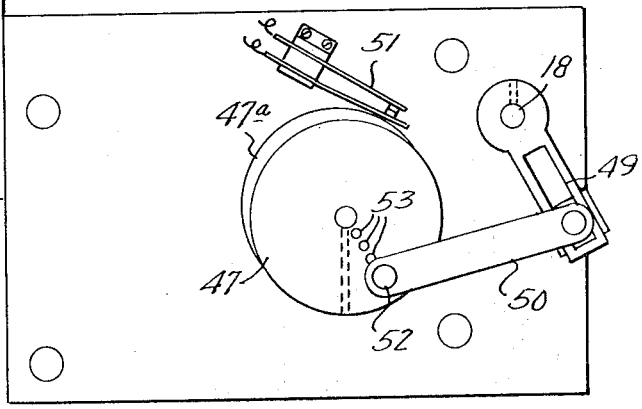
FIG. 5 is a bottom plan view of the portion of the apparatus shown in FIG. 4.

Referring now to FIGS. 3, 4 and 5, there is shown the drive mechanism for the present invention. DC motor 33, which is controlled in a manner to be described below, has output shaft 36 coupled by U-coupling 37 to drive shaft 38. Drive shaft 38 drives worm gear 39, which in turn drives main output gear 40, mounted on shaft 43 journaled between bearings 44. Shaft 43 has also mounted thereon reduction gear 41 which in turn drives gear 42 mounted on shaft 45 and journaled in bearings 46. Mounted on the lower end of shaft 45 is motion cam 47 having cam surface 47a thereon. Connecting rod 50 may be secured to one of adjustment holes 53 provided in cam 47, by lock screw 52. The other end of connecting rod 50 is disposed in stroke adjustment slide 49 which drives output shaft 18, journaled in bearings 48 in a reciprocating oscillatory manner. The length of the oscillation of output shaft 18, before it returns in the opposite direction, is governed by the position selected for the connection of rod 50 to cam 47. In a preferred embodiment of the invention, this adjustment can provide variation in movement of the fishing rod from 6 inches to 4 feet.

As can be seen in FIG. 5, cam surface 47a is designed to close contacts 51 momentarily once during each revolution of cam 47. This closure of contacts 51 is designed to take place on the forward motion of rod 10, i.e., from left to right, as viewed in FIG. 1, or during the counterclockwise rotation of output shaft 18, as viewed in FIG. 5.

Reference is now made to FIG. 9 for a description of the electrical components of a first embodiment of the invention in conjunction with the operation of the apparatus described above. Power on-off switch 29, when closed, applies the potential of battery 34 to contact 58. Rheostat 31 is adjusted to drive motor 33 at the desired speed and lever arm 21 is moved into depressions 64a, so as to cause contact 58 to make contact with motor contact 57. This will apply battery potential to motor 33 through rheostat 31 and also cause lamp 30 to light, indicating that the apparatus is in motion. As explained above, once during each revolution of cam 47, driven by motor 33, contacts 51 will be momentarily closed. This will cause rheostat 31 to be by-passed and full battery potential to be placed across motor 33, causing it to momentarily speed up, resulting in a slight jerk on the forward stroke of rod 10 for the purposes described above. When a fish strikes with sufficient force to pull line 11 from between balls 22, lever arm 21 will be pivoted out of contact with either of depressions 64 or 64 a, causing contact 58 to be urged into engagement with buzzer contact 56 and out of engagement with contact 57. This will cause buzzer 32 to sound, indicating that a strike has been made and motor 33 to stop. At the same time, line 11 will be returned to reel 10a and the fisherman may now turn off the apparatus by means of switch 29, remove his rod from clips 14 and reel in the fish.

Figure 12:
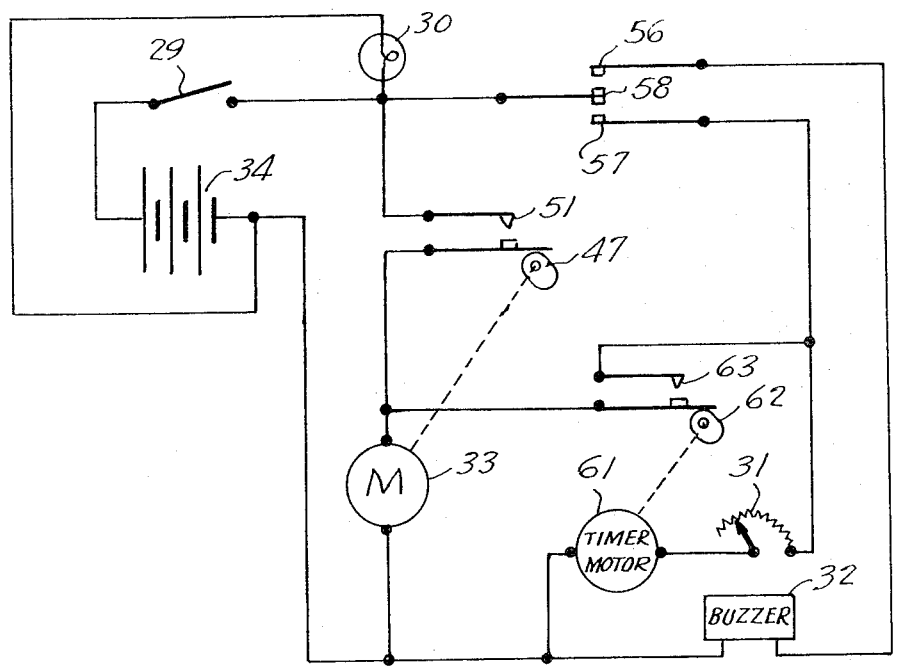
FIG. 12 is a schematic wiring diagram, showing the electrical interconnection of the components in a second embodiment of the invention.

Referring now to FIG. 12, there is shown an alternative wiring diagram for controlling the motion of the rod in a different manner. The purpose of this arrangement is to obtain a pause with every forward and backward motion of the fishing rod.

This is accomplished by providing timer motor 61, which controls cam 62 in a manner similar to that described above with respect to cam 47 and motor 33. In this embodiment of the invention, cam 62 momentarily closes contact 63 which places battery voltage across drive motor 33. This causes cam 47 to close contacts 51 which remain closed except at a preselected portion of the rotation of cam 47 corresponding to the end of the forward stroke and the end of the backward stroke. The relationship of cams 62 and 47 is such that after a predetermined pause, cam 62 will again close contact 63, reinitiating the above-described cycle. Rheostat 31 is adjusted to provide the desired number of strokes per minute of fishing rod 10. In all other respects, the operation of the FIG. 12 embodiment is identical to that described above with respect to FIG. 9.

While the operation of the invention has been described with respect to imparting a forward and backward motion to the rod, it should be realized that the above-described apparatus can also be used simply as an alarm device. If lever arm 21 remains in the neutral position, i.e., in depression 64, as shown in FIG. 10, the motor will not be activated. Thus, when a fish strikes, pulling line 11 against lever arm 21 and disengaging it from depression 64, buzzer 32 will sound, indicating that a fish has been hooked.

In a preferred embodiment of the invention, a motor 33 was a 1/12th horsepower, 12 volt DC motor driving a gear train of 100 to 1 ratio reduction. This results in approximately 300 inch pounds of developed torque. It has been found that with this reduction, one can achieve from 18 to 36 strokes per minute with less than 20 percent loss in power.

It will thus be seen that there has been described an apparatus for moving a fishing rod mounted in a holder back and forth at a preadjusted length of stroke and speed, for giving the lure attached to the line life-like movement in the water while trolling.

While preferred embodiments of the invention has been described, it will be apparent to those skilled in the art that various modifications may be made therein without departing from the essence of the invention. It is, therefore, intended that the scope of the invention be defined by the claims appended hereto.

I claim:

1. Apparatus for automatically controlling the motion of a fishing rod, comprising:
   a. means for clamping said fishing rod in position;
   b. means for reciprocating said clamping means so as to move said rod with a fore and aft motion;

c. means for varying the degree of reciprocation of said clamping means so as to vary the degree of movement of said rod; and d. means responsive to a predetermined movement of a fishing line attached to said rod for deactivating said means for reciprocating.

2. The apparatus set forth in claim 1, wherein said means for deactivating comprises means for holding said line against said predetermined movement and means for adjusting the holding force in accordance with the weight of lure utilized.

3. The apparatus set forth in claim 2, wherein said holding means comprises two spring-loaded balls and said adjusting means comprises means for varying the spring tension.

4. The apparatus set forth in claim 2, wherein said means for deactivating further includes switch means having a switch lever, said switch lever being so disposed with respect to said line that said predetermined movement of said line causes said lever to activate said switch and deactivate said means for reciprocating.

5. The apparatus set forth in claim 4, further including means activated by said lever to generate a signal when said line undergoes said predetermined movement.

6. The apparatus set forth in claim 1, further including means for increasing the speed of travel of said rod over a predetermined portion of its path of travel.

7. The apparatus set forth in claim 6, wherein said means for reciprocating includes a motor and said speed increasing means comprises means driven by said motor for momentarily increasing the speed of said motor.

8. The apparatus set forth in claim 7, wherein said means driven by said motor comprises cam means and further including contact means closed by said cam means for momentarily increasing the voltage across said motor.

9. The apparatus set forth in claim 1, further including means for swivelling said clamping means in a direction perpendicular to said fore and aft motion.

10. Apparatus for automatically controlling the motion of a fishing rod, comprising:

a. means for clamping said fishing rod in position;

b. means for reciprocating said clamping means so as to move said rod with a fore and aft motion, including:
  i. drive motor means;
  ii. reduction gear means coupled to said drive motor means; and
  iii. an output shaft driven by said reduction gear means; and c. means for varying the degree of reciprocation of said clamping means comprising adjustable slide means linked to said output shaft and said gear means.

11. Apparatus for automatically controlling the motion of a fishing rod comprising:

a. means for clamping said fishing rod in position;

b. means for reciprocating said clamping means so as to move said rod with a fore and aft motion; and c. means for stopping said rod for a predetermined period of time at a predetermined point in its path of travel.

12. The apparatus set forth in claim 11, wherein said means for reciprocating comprises motor means and said means for stopping said rod comprises cam means driven by said motor means.

13. The apparatus set forth in claim 12, wherein said motor means comprises a timer motor for driving a first cam at a predetermined speed and a drive motor for driving a second cam and further including a first set of contacts momentarily closed by said first cam means and a second set of contacts closed by said second cam means, said first and second contacts being operative to place operating voltage across said drive motor.

* * * * *